United States Patent
Sakamoto et al.

(10) Patent No.: US 6,878,769 B2
(45) Date of Patent: Apr. 12, 2005

(54) ROOM TEMPERATURE CURABLE ORGANOPOLYSILOXANE COMPOSITIONS

(75) Inventors: Takafumi Sakamoto, Gunma-ken (JP); Tsuneo Kimura, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 9 days.

(21) Appl. No.: 10/327,140

(22) Filed: Dec. 24, 2002

(65) Prior Publication Data
US 2003/0153672 A1 Aug. 14, 2003

(30) Foreign Application Priority Data
Dec. 25, 2001 (JP) .................................. 2001-391272

(51) Int. Cl.$^7$ .................. C08L 83/06; C08G 77/08
(52) U.S. Cl. .............. 524/588; 524/267; 524/268; 528/17; 528/33; 528/34; 528/35
(58) Field of Search ............... 524/588, 267, 524/268; 528/17, 33, 34, 35

(56) References Cited

U.S. PATENT DOCUMENTS

| | | | | | |
|---|---|---|---|---|---|
| 3,933,729 | A | * | 1/1976 | Letoffe | 524/588 |
| 4,539,367 | A | * | 9/1985 | Beers | 524/731 |
| 4,652,624 | A | * | 3/1987 | Allen et al. | 528/17 |
| 4,888,404 | A | * | 12/1989 | Klosowski et al. | 528/15 |
| 5,840,794 | A | * | 11/1998 | Palmer | 524/425 |
| 6,008,284 | A | * | 12/1999 | Nylund et al. | 524/425 |

FOREIGN PATENT DOCUMENTS

| | | |
|---|---|---|
| EP | 0158427 B1 | 10/1985 |
| EP | 0164470 B1 | 12/1985 |
| EP | 0233954 B1 | 9/1987 |
| JP | 39-27643 | 10/1961 |
| JP | 55-43119 A | 3/1980 |
| JP | 7-39547 B2 | 5/1995 |
| WO | WO 00/37565 A1 | 6/2000 |

OTHER PUBLICATIONS

English Abstract of JP 05–262989 Oct. 1993.

* cited by examiner

*Primary Examiner*—Jeffrey B. Robertson
(74) *Attorney, Agent, or Firm*—Birch, Stewart, Kolasch & Birch, LLP

(57) ABSTRACT

A room temperature curable organopolysiloxane composition comprising (A) an organopolysiloxane having organooxysilyl groups on side chains or on side chains and ends of the polymer, (B) fumed silica, (C) an organooxysilane or a partial hydrolytic condensate thereof, and (D) a condensation catalyst is improved in stability during storage under sealed conditions and cures into an elastomeric product whose physical properties change little even when used under rigorous conditions as encountered in proximity to automotive engines.

13 Claims, No Drawings

ROOM TEMPERATURE CURABLE ORGANOPOLYSILOXANE COMPOSITIONS

This nonprovisional application claims priority under 35 U.S.C. § 119(a) on Patent Application No. 2001-391272 filed in JAPAN on Dec. 25, 2001, which is herein incorporated by reference.

This invention relates to room temperature curable organopolysiloxane compositions, and more particularly, to room temperature curable organopolysiloxane compositions for use in proximity to automotive engines, and having improved oil resistance and coolant resistance.

BACKGROUND OF THE INVENTION

Various types of room temperature curable organopolysiloxane compositions are well known in the art which cure into elastomers at room temperature upon contact with air-borne moisture. Among others, those compositions of the type that cure while releasing alcohol are preferentially used in sealing, bonding and coating of electric and electronic equipment, owing to their advantageous features of no disgusting odor and no corrosion of metals. One typical composition of this type is described in JP-B 39-27643 as comprising an organopolysiloxane end-blocked with hydroxyl groups, an alkoxysilane, and an organic titanium compound. Also JP-A 55-43119 discloses a composition comprising an organopolysiloxane end-blocked with alkoxysilyl groups, an alkoxysilane, and alkoxy titanium. JP-B 7-39547 discloses a composition comprising a linear organopolysiloxane end-blocked with alkoxysilyl groups (including silethylene), an alkoxysilane, and alkoxy titanium.

However, these compositions lack oil resistance and long-life coolant (LLC) resistance which are requisite when used in proximity to automotive engines.

SUMMARY OF THE INVENTION

An object of the invention is to provide a room temperature curable organopolysiloxane composition which cures into an elastomer whose physical properties change little even when used under rigorous conditions as encountered in proximity to automotive engines, and which remains stable during storage under sealed conditions.

It has been found that by using as the base polymer an organopolysiloxane having at least one organooxy group-bonded silicon atom each attached to an end and a side chain of the polymer through a divalent hydrocarbon group, and/or an organopolysiloxane having at least two organooxy group-bonded silicon atoms only on side chains of the polymer, and combining it with silica, an organooxysilane or partial hydrolytic condensate thereof, and a condensation catalyst, there is obtained a room temperature curable organopolysiloxane composition which is improved in stability during storage under sealed conditions and cures into an elastomeric product whose physical properties change little even when used under rigorous conditions as encountered in proximity to automotive engines, as compared with prior art room temperature curable organopolysiloxane compositions of the one part, alcohol-removal type.

The invention provides a room temperature curable organopolysiloxane composition comprising, as essential components, (A) 100 parts by weight of an organopolysiloxane having at least one organooxysilyl group each at an end and a side chain of the polymer, and/or an organopolysiloxane having at least two organooxysilyl groups only on side chains of the polymer, (B) 1 to 40 parts by weight of fumed silica, (C) 0.5 to 25 parts by weight of an organooxysilane having the general formula: $R^1{}_a Si(OR^2)_{4-a}$ wherein $R^1$ is a monovalent hydrocarbon group, $R^2$ is a monovalent hydrocarbon group or alkoxy-substituted monovalent hydrocarbon group, and "a" is 0 or 1, or a partial hydrolytic condensate thereof, and (D) 0.1 to 10 parts by weight of a condensation catalyst.

DESCRIPTION OF THE PREFERRED EMBODIMENTS

Component (A) used herein is important and becomes a base polymer in the composition of the invention. To acquire improved LLC resistance and oil resistance, component (A) must be an organopolysiloxane having at least one organooxy group-bonded silicon atom each attached to an end and a side chain of the polymer through a divalent hydrocarbon group, and/or an organopolysiloxane having at least two organooxysilyl groups only on side chains of the polymer.

Preferred organopolysiloxanes have the following general formulae (1) and (2).

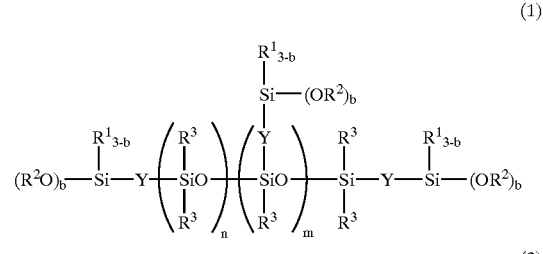

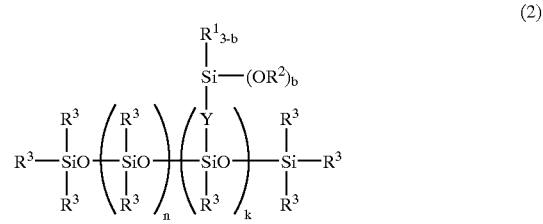

Herein $R^1$ is a monovalent hydrocarbon group, $R^2$ is a monovalent hydrocarbon group or alkoxy-substituted monovalent hydrocarbon group, $R^3$ is a substituted or unsubstituted monovalent hydrocarbon group, Y is a divalent hydrocarbon group having 1 to 8 carbon atoms, b is an integer of 1 to 3, k is an integer of 2 to 10, m is an integer of 1 to 10, and n is such an integer that the organopolysiloxane may have a viscosity of 20 to 1,000,000 centipoise at 25° C.

In formulae (1) and (2), the monovalent hydrocarbon groups represented by $R^1$ and $R^3$ are preferably unsubstituted or substituted (e.g., halo or cyano substituted) monovalent hydrocarbon groups having 1 to 12 carbon atoms, especially 1 to 10 carbon atoms, for example, alkyl groups such as methyl, ethyl, propyl, butyl, hexyl, octyl, decyl and octadecyl; cycloalkyl groups such as cyclopentyl and cyclohexyl; alkenyl groups such as vinyl and allyl; aryl groups such as phenyl, tolyl and naphthyl; and aralkyl groups such as benzyl, phenylethyl and phenylpropyl. Exemplary halogenated hydrocarbon groups include chloromethyl, trifluoromethyl, chloropropyl, 3,3,3-trifluoropropyl, chlorophenyl, dibromophenyl, tetrachlorophenyl and difluorophenyl. Exemplary cyano alkyl groups are β-cyanoethyl, γ-cyanopropyl and β-cyanopropyl. Of these, methyl, ethyl, propyl, phenyl and vinyl are preferred, with methyl being most preferred.

Preferred groups represented by $R^2$ are those having 1 to 10 carbon atoms, especially 1 to 4 carbon atoms. Examples of monovalent hydrocarbon groups are as described above. Typical groups are alkyl groups such as methyl, ethyl, propyl, butyl, hexyl and octyl, and alkoxy-substituted alkyl groups such as methoxyethyl, ethoxyethyl, methoxypropyl and methoxybutyl, with methyl and ethyl being most preferred. Y is selected from divalent hydrocarbon groups, for example, alkylene groups having 1 to 8 carbon atoms, especially 1 to 6 carbon atoms, for example, —CH$_2$—, —CH$_2$CH$_2$—, —CH$_2$CH$_2$CH$_2$— or —CH$_2$(CH$_3$)CH—, with —CH$_2$CH$_2$— being most preferred.

The subscripts b, m and k are as defined above, and preferably, b is 2 or 3, m is from 1 to 5, more preferably from 1 to 3, and k is from 2 to 6, more preferably from 2 to 4.

The organopolysiloxane (A) should preferably have a viscosity of 20 to 1,000,000 centipoise at 25° C. With a viscosity of less than 20 cp, the elastomer after curing may not be endowed with satisfactory physical properties, especially flexibility and elongation. A composition comprising an organopolysiloxane with a viscosity in excess of 1,000,000 cp may have such a high viscosity as to interfere with workability upon application. The preferred viscosity is in the range of 100 to 500,000 cp. Differently stated, n in formula (1) or (2) is selected such that the viscosity of the organopolysiloxane may fall in the range of 20 to 1,000,000 centipoise at 25° C.

For preparation of the organopolysiloxane having organooxysilyl groups at ends and side chains thereof through divalent hydrocarbon groups as component (A), any of well-known methods may be used. For example, it is prepared by effecting addition reaction between a corresponding alkenyl-terminated organopolysiloxane and an organooxysilane of the following formula:

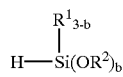

wherein R$^1$, R$^2$ and b are as defined above, in the presence of a Pt catalyst. Alternatively, addition reaction is carried out between a corresponding SiH-terminated organopolysiloxane and an organooxysilane of the following formula:

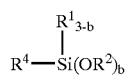

wherein R$^1$, R$^2$ and b are as defined above, and R$^4$ is alkenyl, yielding an organopolysiloxane (A).

Component (B) is fumed silica. It is an important component for providing an appropriate viscosity and rubber reinforcement.

The fumed silica should preferably have a specific surface area of 50 to 400 m$^2$/g, and more preferably 100 to 300 m$^2$/g, because such silica is effective for improving oil resistance, storage stability, appropriate viscosity and rubber physical properties.

Preferably, fumed silica has been surface treated. As the surface-treated fumed silica, use may be made of fumed silicas which have been treated with chlorosilanes such as dimethyldichlorosilane and trimethylchlorosilane and silazanes such as hexamethyldisilazane. Alternatively, fumed silica is surface treated during preparation of the composition.

Component (B) is generally added in amounts of 1 to 40 parts by weight, preferably 3 to 30 parts by weight, per 100 parts by weight of component (A). A composition containing a larger amount of component (B) may have so high a viscosity as to interfere with mixing and working during application. With too small amounts of component (B), physical properties of cured rubber may become poor.

Component (C) serves as a crosslinker for helping the composition cure into a rubber elastomer. It is an organooxysilane having the general formula:

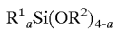

wherein R$^1$ is a monovalent hydrocarbon group, R$^2$ is a monovalent hydrocarbon group or alkoxy-substituted monovalent hydrocarbon group, and "a" is 0 or 1, or a partial hydrolytic condensate thereof. It is understood that R$^1$ and R$^2$ are the same as in formulae (1) and (2), with examples being also the same as described above.

Illustrative examples of the organooxysilane (C) include tetrafunctional alkoxysilanes such as tetramethoxysilane, tetraethoxysilane and methylcellosolve orthosilicate; trifunctional alkoxysilanes such as methyltrimethoxysilane, methyltriethoxysilane, ethyltrimethoxysilane, vinyltrimethoxysilane, phenyltrimethoxysilane and methyltrimethoxyethoxysilane, and partial hydrolytic condensates thereof. These organooxysilanes may be used alone or in admixture of any. In order to impart low modulus to rubber elastomers after curing, difunctional alkoxysilanes such as diphenyldimethoxysilane and dimethyldimethoxysilane may be additionally added.

Component (C) is generally added in amounts of 0.5 to 25 parts by weight, preferably 1 to 15 parts by weight, per 100 parts by weight of component (A). With too small amounts of component (C), the composition may not fully cure and tends to thicken and gel during storage in a cartridge. Too large amounts of component (C) may retard curing, provide unsatisfactory rubber physical properties and be uneconomical.

Component (D) is a catalyst for the inventive composition to cure. Exemplary catalysts include organotitanium compounds such as tetraisopropoxytitanium, tetra-t-butoxytitanium, titanium diisopropoxide bis(ethyl acetoacetate), and titanium diisopropoxide bis (acetylacetonate); organotin compounds such as dibutyltin dilaurate, dibutyltin bisacetylacetonate and tin octylate; dicarboxylic acid salts of metals such as lead dioctylate; organozirconium compounds such as zirconium tetraacetylacetonate; organoaluminum compounds such as aluminum triacetylacetonate; and amines such as hydroxylamine and tributylamine. Of these, organotitanium compounds are preferred. Titanium chelate catalysts are most preferred for enhancing the storage stability of the inventive composition. Typical titanium chelate catalysts are of the general formulae (3) and (4).

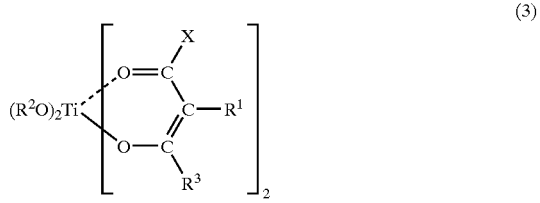

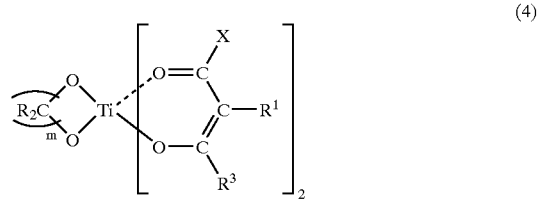

Herein, X is a monovalent hydrocarbon group, alkoxy group or amino group, R$^1$, R$^2$ and R$^3$ are as defined above. The monovalent hydrocarbon groups represented by X are exemplified by monovalent hydrocarbon groups of 1 to 12 carbon atoms, especially 1 to 10 carbon atoms, as described for $R^1$ and $R^3$. Preferred alkoxy groups are those of 1 to 8 carbon atoms, especially 1 to 6 carbon atoms.

Illustrative examples of titanium chelate catalysts include titanium diisopropoxide bis(ethyl acetoacetate), titanium diisopropoxide bis(acetylacetone), titanium dibutoxide bis(methyl acetoacetate), and those of the formulae shown below.

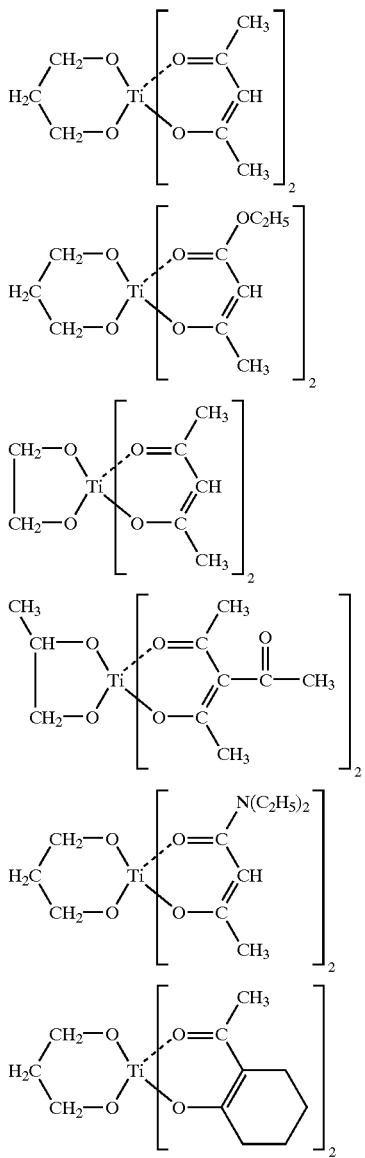

Component (D) is generally added in catalytic amounts, preferably amounts of 0.1 to 10 parts by weight, preferably 0.2 to 7 parts by weight, per 100 parts by weight of component (A). With too small amounts of component (D), the composition will slowly cure. With too large amounts of component (D), the composition will cure too fast and become unstable during storage.

Further included in the composition according to a preferred embodiment of the invention is (E) an organosiloxane consisting essentially of $R^4{}_3SiO_{1/2}$ units and $SiO_{4/2}$ units wherein $R^4$ is a substituted or unsubstituted monovalent hydrocarbon group having 1 to 6 carbon atoms, in which the molar ratio of $R^4{}_3SiO_{1/2}$ units to $SiO_{4/2}$ units is from 0.6/1 to 1.2/1, and the content of hydroxysilyl groups is less than 0.7% by weight. Component (E) serves to enhance the crosslinking density of the composition and plays an important role in improving oil resistance by cooperating with components (A) and (F).

In the above formula, the monovalent hydrocarbon groups represented by $R^4$ include alkyl, alkenyl, phenyl and halogenated alkyl groups, preferably methyl, phenyl and vinyl groups, with methyl and vinyl being most preferred.

Component (E) is generally added in amounts of up to 50 parts by weight, preferably 2 to 40 parts by weight, per 100 parts by weight of component (A). With too small amounts of component (E), the composition may show low mechanical strength after oil immersion. With too large amounts of component (E), the composition will slowly cure or rubber physical properties may become insufficient.

Further included in the composition according to another preferred embodiment of the invention is (F) a basic filler. It is effective for improving the oil resistance, appropriate viscosity and rubber physical properties of the composition.

Examples of suitable basic filler include calcium carbonate, calcium oxide, magnesia, aluminum hydroxide, microparticulate alumina, zinc oxide and zinc carbonate, which may be surface treated with silanes, silazanes, low degree-of-polymerization siloxanes, and organic compounds. Pretreated basic fillers are also useful. Alternatively, the basic filler may be treated with a silane during preparation of the composition. In order that the composition maintain its desired properties, it is important that no substantial quantities of by-products resulting from such treatment, catalysts and the like be left in the composition.

Component (F) is generally added in amounts of up to 200 parts by weight, preferably 5 to 150 parts by weight, per 100 parts by weight of component (A). With too large amounts of component (F), the composition may have so high a viscosity as to interfere with mixing and workability upon application. With too small amounts of component (F), physical properties of cured rubber may become poor.

In addition to components (A) to (F) described above, optionally, the invention composition may further contain a fine powder inorganic filler for improving flow characteristics prior to curing, and endowing the rubbery elastomer after curing with desired mechanical properties. Suitable inorganic fillers include quartz flour, fumed titanium dioxide, diatomaceous earth and glass balloons, which may be surface treated with silanes, silazanes, low degree-of-polymerization siloxanes, organic compounds or the like. Further, for the purpose of improving adhesion to substrates, adhesion improving agents may be included, for example, silane coupling agents such as amino-containing alkoxysilanes, epoxy-containing alkoxysilanes, and mercapto-containing alkoxysilanes. These silane coupling agents may be used alone or in admixture of any. Reaction mixtures of an amino-containing alkoxysilane with an epoxy-containing alkoxysilane are also useful. Of these, the reaction mixtures of an amino-containing alkoxysilane with an epoxy-containing alkoxysilane are most effective for improving adhesion.

Furthermore, organic solvents, mildew-proofing agents, flame retardants, heat resistance modifiers, plasticizers, thixotropic agents, pigments and the like may be added to the inventive composition.

The inventive composition may be prepared by mixing components (A) to (F) and optional additives under humidity-shielded conditions. The composition thus obtained is stored in a sealed container and on use, exposed to air-borne moisture whereupon it cures into a rubbery elastomer. That is, the inventive composition can be used as one part type RTV organopolysiloxane composition.

The inventive composition is suited as a sealing material for automobiles. It may also find application as sealing materials for buildings, sealing materials, adhesives and humidity-proof coatings for electric and electronic parts, and coatings and adhesives for items of fibers, glass, metals, and plastics.

EXAMPLE

Examples of the invention are given below by way of illustration and not by way of limitation. All parts are by weight. Viscosity is a measurement in centipoise (cp) at 25° C.

Synthesis Example 1

To 100 parts of α,ω-dimethylvinyl-dimethylpolysiloxane containing two vinyl groups on side chains and having a viscosity of 30,000 cp were added 7 parts of trimethoxysilane and 1 part of a 1% isopropanol solution of chloroplatinic acid as the catalyst. In a $N_2$ gas stream, they were mixed at 80° C. for 8 hours. The mixture was then heated at 50° C. under a vacuum of 10 mmHg, distilling off the excess trimethoxysilane.

The polymer thus obtained had a viscosity of 31,000 cp. When the polymer was mixed with tetrabutyl titanate in a ratio of 100:1, it did not thicken immediately and cured after one day. This suggests that trimethoxysilane added to vinyl groups at ends and side chains of the polymer. This polymer is designated Polymer A and has the average formula shown below.

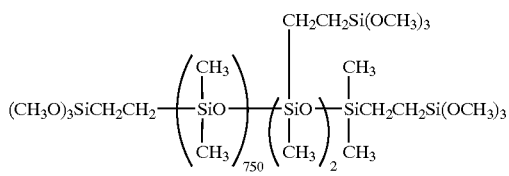

Synthesis Example 2

To 100 parts of α,ω-dimethylvinyl-dimethylpolysiloxane having a viscosity of 30,000 cp were added 5 parts of trimethoxysilane and 1 part of a 1% isopropanol solution of chloroplatinic acid as the catalyst. In a $N_2$ gas stream, they were mixed at 80° C. for 8 hours. The mixture was then heated at 50° C. under a vacuum of 10 mmHg, distilling off the excess trimethoxysilane.

The polymer thus obtained had a viscosity of 30,500 cp. When the polymer was mixed with tetrabutyl titanate in a ratio of 100:1, it did not thicken immediately and cured after one day. This suggests that trimethoxysilane added to vinyl groups at ends of the polymer. This polymer is designated Polymer B and has the average formula shown below.

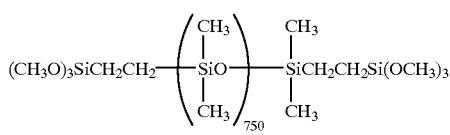

Synthesis Example 3

To 100 parts of α,ω-dihydroxy-dimethylpolysiloxane having a viscosity of 30,000 cp were added 10 parts of tetramethoxysilane and 0.1 part of isopropylamine as the catalyst. In a $N_2$ gas stream, they were mixed at 100° C. for 6 hours. The mixture was then heated at 50° C. under a vacuum of 10 mmHg, distilling off the excess tetramethoxysilane.

The polymer thus obtained had a viscosity of 30,500 cp. When the polymer was mixed with tetrabutyl titanate in a ratio of 100:1, it did not thicken immediately and cured after one day. This suggests that the polymer ends were substituted with trimethoxysilyl groups. This polymer is designated Polymer C and has the average formula shown below.

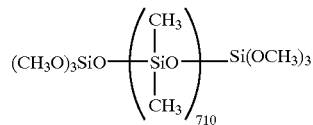

Example 1

A composition was prepared by uniformly mixing 50 parts of Polymer A, 9 parts of fumed silica having a specific surface area of 110 $m^2/g$ and surface treated with dimethyldichlorosilane, and 30 parts of colloidal calcium carbonate (Hakuenka CCR by Shiraishi Kogyo Co., Ltd.), and further mixing them with 3 parts of vinyltrimethoxysilane and 2 parts of titanium diisopropoxide bis(ethyl acetoacetate) in vacuum until uniform. The composition was contained in a plastic cartridge, which was sealed.

Example 2

A composition was prepared by uniformly mixing 100 parts of Polymer A, 9 parts of fumed silica having a specific surface area of 110 $m^2/g$ and surface treated with dimethyldichlorosilane, 30 parts of colloidal calcium carbonate (Hakuenka CCR by Shiraishi Kogyo Co., Ltd.), and 10 parts of a resinous siloxane copolymer consisting of trimethylsiloxy units (($CH_3)_3SiO_{1/2}$ units) and $SiO_{4/2}$ units, with a $(CH_3)_3SiO_{1/2}/SiO_{4/2}$ molar ratio of 0.74 and a silanol content of 0.06 mol/100 g, in toluene at a concentration of 50 wt % solids, and further mixing them with 3 parts of vinyltrimethoxysilane and 2 parts of titanium diisopropoxide bis(ethyl acetoacetate) in vacuum until uniform. The composition was contained in a plastic cartridge, which was sealed.

The compositions of the Examples were worked into sheets of 2 mm thick and cured in an atmosphere of 23° C. and RH 50% for 7 days. Rubber physical properties (hardness, tensile strength and elongation at break) of the cured sheets were measured according to JIS K-6249. The sheets were subjected to a storage test, an oil resistance test and an LLC resistance test, conditions of which are described below, before rubber physical properties (hardness, tensile strength and elongation at break) were measured again. The results are shown in Table 1.

Storage Test:
A sheet was stored for 7 days while heating at 70° C. in a dryer.

Oil Resistance Test:
A sheet was immersed in Toyota engine oil "Neo SJ20" at 120° C. for 240 hours.

LLC Resistance Test:
A sheet was immersed in a 50% aqueous dilution of Toyota long-life coolant (LLC) at 120° C. for 240 hours.

Comparative Example 1

A composition was prepared as in Example 1 except that Polymer B was used instead of Polymer A. On this composition, the same tests as in Example 1 were carried out. The results are shown in Table 1.

Comparative Example 2

A composition was prepared as in Example 2 except that Polymer B was used instead of Polymer A. On this composition, the same tests as in Example 2 were carried out. The results are shown in Table 1.

Comparative Example 3

A composition was prepared as in Example 1 except that Polymer C was used instead of Polymer A. On this composition, the same tests as in Example 1 were carried out. The results are shown in Table 1.

Comparative Example 4

A composition was prepared as in Example 2 except that Polymer C was used instead of Polymer A. On this composition, the same tests as in Example 2 were carried out. The results are shown in Table 1.

TABLE 1

|  |  |  | Example | | Comparative Example | | | |
|---|---|---|---|---|---|---|---|---|
|  |  |  | 1 | 2 | 1 | 2 | 3 | 4 |
| As cured | Hardness | (Durometer A) | 58 | 60 | 56 | 59 | 50 | 58 |
|  | Elongation | (%) | 220 | 250 | 310 | 330 | 450 | 350 |
|  | Tensile strength | (MPa) | 3.9 | 4.0 | 3.4 | 3.6 | 3.2 | 3.5 |
| After oil test | Hardness | (Durometer A) | 48 | 52 | 30 | 35 | 15 | 33 |
|  | Elongation | (%) | 200 | 240 | 290 | 300 | 610 | 300 |
|  | Tensile strength | (MPa) | 3.4 | 3.6 | 1.7 | 2.2 | 1.6 | 2.1 |
| After LLC test | Hardness | (Durometer A) | 57 | 58 | 46 | 48 | 18 | 35 |
|  | Elongation | (%) | 210 | 230 | 300 | 340 | 750 | 450 |
|  | Tensile strength | (MPa) | 3.5 | 3.8 | 3.0 | 2.8 | 1.1 | 1.6 |
| After storage | Hardness | (Durometer A) | 58 | 58 | 48 | 46 | 48 | 43 |
|  | Elongation | (%) | 230 | 270 | 450 | 380 | 500 | 300 |
|  | Tensile strength | (MPa) | 3.8 | 3.8 | 3.0 | 3.3 | 2.3 | 1.5 |

The room temperature curable organopolysiloxane composition of the invention is improved in stability during storage under sealed conditions and cures into an elastomeric product whose physical properties change little even when used under rigorous conditions as encountered in proximity to automotive engines, as compared with prior art RTV organopolysiloxane compositions of the one part, alcohol-removal type.

Japanese Patent Application No. 2001-391272 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A room temperature curable organopolysiloxane composition comprising
   (A) 100 parts by weight of an organopolysiloxane having at least one organooxysilyl group each at an end and a side chain of the polymer, and/or an organopolysiloxane having at least two organooxysilyl groups only on side chains of the polymer,
   (B) 1 to 40 parts by weight of fumed silica,
   (C) 0.5 to 25 parts by weight of an organooxysilane having the general formula: $R^1_a Si(OR^2)_{4-a}$ wherein $R^1$ is a monovalent hydrocarbon group, $R^2$ is a monovalent hydrocarbon group or alkoxy-substituted monovalent hydrocarbon group, and "a" is 0 or 1, or a partial hydrolytic condensate thereof, and
   (D) 0.1 to 10 parts by weight of a titanium chelate catalyst.

2. A room temperature curable organopolysiloxane composition comprising
   (A) 100 parts by weight of an organopolysiloxane having at least one organooxysilyl group each at an end and a side chain of the polymer, and/or an organopolysiloxane having at least two organooxysilyl groups only on side chains of the polymer,
   (B) 1 to 40 parts by weight of fumed silica,
   (C) 0.5 to 25 parts by weight of an organooxysilane having the general formula: $R^1_a Si(OR^2)_{4-a}$ wherein $R^1$ is a monovalent hydrocarbon group, $R^2$ is a monovalent hydrocarbon group or alkoxy-substituted monovalent hydrocarbon group, and "a" is 0 or 1, or a partial hydrolytic condensate thereof,
   (D) 0.1 to 10 parts by weight of a condensation catalyst, and
   (E) an organosiloxane consisting essentially of $R^4_3 SiO_{1/2}$ units and $SiO_{4/2}$ units wherein $R^4$ is a substituted or unsubstituted monovalent hydrocarbon group having 1 to 6 carbon atoms, the molar ratio of $R^4_3 SiO_{1/2}$ units to $SiO_{4/2}$ units being from 0.6 to 1.2, said organosiloxane containing less than 0.7% by weight of hydroxysilyl groups.

3. A room temperature curable organopolysiloxane composition comprising
   (A) 100 parts by weight of an organopolysiloxane having the following general formula (1) and/or (2):

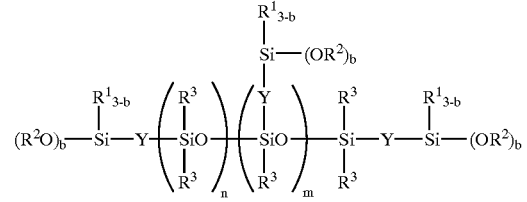

(1)

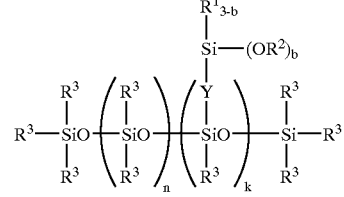

(2)

wherein $R^1$ is a monovalent hydrocarbon group, $R^2$ is a methyl group or ethyl group, $R^3$ is a substituted or unsubstituted monovalent hydrocarbon group, Y is a divalent hydrocarbon group having 1 to 8 carbon atoms, b is an integer of 1 to 3, k is an integer of 2 to 10, m is an integer of 1 to 10, and n is such an integer that the organopolysiloxane may have a viscosity of 20 to 1,000,000 centipoise at 25° C., (B) 1 to 40 parts by weight of fumed silica, (C) 0.5 to 25 parts by weight of an organooxysilane having the general formula: $R^1_a Si(OR^2)_{4-a}$ wherein $R^1$ is a monovalent hydrocarbon group, $R^2$ is a monovalent hydrocarbon group or alkoxy-substituted monovalent hydrocarbon group, and "a" is 0 or 1, or a partial hydrolytic condensate thereof, and (D) 0.1 to 10 parts by weight of a condensation catalyst.

4. The composition of claim 2, wherein the condensation catalyst (D) is a titanium chelate catalyst.

5. A room temperature curable organopolysiloxane composition comprising (A) 100 parts by weight of an organopolysiloxane having the following general formula (1) and/or (2):

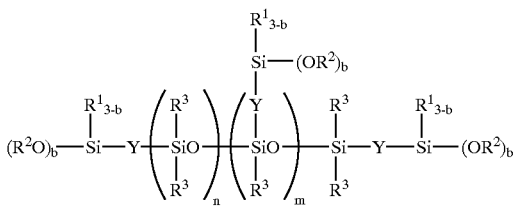

(1)

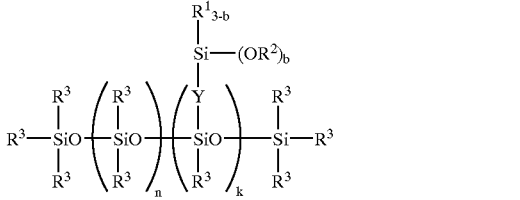

(2)

wherein $R^1$ is a monovalent hydrocarbon group, $R^2$ is a monovalent hydrocarbon group or alkoxy-substituted monovalent hydrocarbon group, $R^3$ is a substituted or unsubstituted monovalent hydrocarbon group, Y is a divalent hydrocarbon group having 1 to 8 carbon atoms, b is an integer of 1 to 3, k is an integer of 2 to 10, m is an integer of 1 to 10, and n is such an integer that the organopolysiloxane may have a viscosity of 20 to 1,000,000 centipoise at 25° C., (B) 1 to 40 parts by weight of fumed silica, (C) 0.5 to 25 parts by weight of an organooxysilane having the general formula: $R^1_a Si(OR^2)_{4-a}$ wherein $R^1$ is a monovalent hydrocarbon group, $R^2$ is a monovalent hydrocarbon group or alkoxy-substituted monovalent hydrocarbon group, and "a" is 0 or 1, or a partial hydrolytic condensate thereof, and (D) 0.1 to 10 parts by weight of a titanium chelate catalyst.

6. The composition of claim 1, further comprising a basic filler.

7. The composition of claim 2, further comprising a basic filler.

8. The composition of claim 3, further comprising a basic filler.

9. The composition of claim 1, wherein the organooxysilane (C) is selected from the group consisting of tetramethoxysilane, tetraethoxysilane, methylcellosolve orthosilicate, methyltrimethoxysilane, methyltriethoxysilane, ethyltrimethoxysilane, vinyltrimethoxysilane, phenyltrimethoxysilane, methyltrimethoxyethoxysilane, and partial hydrolytic condensates thereof.

10. The composition of claim 2, wherein the organooxysilane (C) is selected from the group consisting of tetramethoxysilane, tetraethoxysilane, methylcellosolve orthosilicate, methyltrimethoxysilane, methyltriethoxysilane, ethyltrimethoxysilane, vinyltrimethoxysilane, phenyltrimethoxysilane, methyltrimethoxyethoxysilane, and partial hydrolytic condensates thereof.

11. The composition of claim 3, wherein the organooxysilane (C) is selected from the group consisting of tetramethoxysilane, tetraethoxysilane, methylcellosolve orthosilicate, methyltrimethoxysilane, methyltriethoxysilane, ethyltrimethoxysilane, vinyltrimethoxysilane, phenyltrimethoxysilane, methyltrimethoxyethoxysilane, and partial hydrolytic condensates thereof.

12. The composition of claim 5, further comprising a basic filler.

13. The composition of claim 5, wherein the organooxysilane (C) is selected from the group consisting of tetramethoxysilane, tetraethoxysilane, methylcellosolve orthosilicate, methyltrimethoxysilane, methyltriethoxysilane, ethyltrimethoxysilane, vinyltrimethoxysilane, phenyltrimethoxysilane, methyltrimethoxyethoxysilane, and partial hydrolytic condensates thereof.

* * * * *